(12) United States Patent
Kitamura

(10) Patent No.: US 10,002,111 B2
(45) Date of Patent: Jun. 19, 2018

(54) MOBILE TERMINAL WITH DUAL DISPLAYS FOR DISPLAYING DIFFERING AMOUNTS OF INFORMATION

(71) Applicant: NEC CASIO MOBILE COMMUNICATIONS, LTD., Kanagawa (JP)

(72) Inventor: Takeshi Kitamura, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days. days.

(21) Appl. No.: 14/391,844

(22) PCT Filed: Apr. 5, 2013

(86) PCT No.: PCT/JP2013/002360
§ 371 (c)(1),
(2) Date: Oct. 10, 2014

(87) PCT Pub. No.: WO2013/153795
PCT Pub. Date: Oct. 17, 2014

(65) Prior Publication Data
US 2015/0074514 A1    Mar. 12, 2015

(30) Foreign Application Priority Data
Apr. 13, 2012    (JP) .................................. 2012-091923

(51) Int. Cl.
*G06F 17/21* (2006.01)
*G06F 3/14* (2006.01)
(Continued)

(52) U.S. Cl.
CPC ........ *G06F 17/212* (2013.01); *G06F 3/04842* (2013.01); *G06F 3/1423* (2013.01);
(Continued)

(58) Field of Classification Search
CPC .. G06F 17/212; G06F 3/04842; G06F 3/1423; G06F 17/2247; G06F 17/30905; G09G 2340/145
(Continued)

(56) References Cited

U.S. PATENT DOCUMENTS

| 8,350,814 B2 | 1/2013 | Kim et al. |
| 8,760,418 B2 | 6/2014 | Miyazawa et al. |

(Continued)

FOREIGN PATENT DOCUMENTS

| EP | 2129084 | 12/2009 |
| JP | 2006-331342 | 12/2006 |

(Continued)

OTHER PUBLICATIONS

"Kyocera launches first dual-display Android smartphone on Sprint", Shukla, published prior to Feb. 13, 2011, <http://androidos.in/2011/02/kyocera-launches-first-dual-display-android-smartphone-on-sprint/?>.*

(Continued)

*Primary Examiner* — Stephen S Hong
*Assistant Examiner* — Broderick C Anderson
(74) *Attorney, Agent, or Firm* — Young & Thompson

(57) ABSTRACT

A cellular phone apparatus includes a screen A and a screen B. In a state where an overview of data for a screen with a large amount of information is guide displayed on the screen B (screen for user selection), every time an arbitrary content is selected, the cellular phone apparatus changes the data for the screen with the large amount of information to data for a screen with a small amount of information while arranging and displaying the selected content obtained via a Web server on the screen A. Accordingly, when data for the screen with the large amount of information is changed to data for the screen with the small amount of information in (Continued)

response to an instruction on a user side, a change that reflects the intentions of the user can be easily achieved.

7 Claims, 14 Drawing Sheets

(51) Int. Cl.
  *G06F 17/30*   (2006.01)
  *G06F 3/0484*   (2013.01)
  *G06F 17/22*   (2006.01)
(52) U.S. Cl.
  CPC .... *G06F 17/2247* (2013.01); *G06F 17/30905* (2013.01); *G09G 2340/145* (2013.01)
(58) Field of Classification Search
  USPC ........................................................ 715/234
  See application file for complete search history.

(56) References Cited

U.S. PATENT DOCUMENTS

| | | | |
|---|---|---|---|
| 8,880,338 B2 | 11/2014 | Inami et al. | |
| 2004/0205627 A1* | 10/2004 | Rosenholtz | G06F 17/30905 715/273 |
| 2005/0120050 A1* | 6/2005 | Myka | G06F 17/30067 |
| 2005/0195316 A1* | 9/2005 | Kollias | G03B 29/00 348/370 |
| 2009/0150760 A1* | 6/2009 | Winkler | A63F 13/00 715/202 |
| 2009/0295731 A1 | 12/2009 | Kim et al. | |
| 2011/0175830 A1 | 7/2011 | Miyazawa et al. | |
| 2012/0101722 A1* | 4/2012 | Inami | G01C 21/3688 701/428 |

FOREIGN PATENT DOCUMENTS

| | | |
|---|---|---|
| JP | 2011-86050 | 4/2011 |
| JP | 2011-113495 | 6/2011 |
| JP | 2011-150412 | 8/2011 |
| JP | 2011-238113 | 11/2011 |
| WO | 2010150892 | 12/2010 |

OTHER PUBLICATIONS

"Cooperative Mobile Web Browsing", Perrucci et al, EURASIP Journal on Wireless Communications and Networking, Apr. 27, 2009, <http://jwcn.eurasipjournals.springeropen.com/articles/10.1155/2009/543054>.*

International Search Report dated Jul. 9, 2013 in International Patent Application No. PCT/JP2013/002360.

Extended European Search Report dated Oct. 13, 2015; Application No. 13776259.7.

Japanese Official Action—2014-510051—dated Oct. 20, 2016.

Japanese Office Action 2014-510051, dated Jan. 27, 2017.

* cited by examiner

MOBILE TERMINAL WITH DUAL DISPLAYS FOR DISPLAYING DIFFERING AMOUNTS OF INFORMATION

CROSS-REFERENCE TO RELATED APPLICATIONS

This is a national stage of International Application No. PCT/JP2013/002360 filed Apr. 5, 2013, claiming priority based on Japanese Patent Application No. 2012-091923 filed Apr. 13, 2012, the entire contents of which are incorporated herein by reference.

TECHNICAL FIELD

The present invention relates to a mobile terminal apparatus, mobile communication system, mobile communication method and program capable of displaying data for a screen with a large amount of information as data for a screen with a small amount of information.

BACKGROUND ART

In general, a mobile terminal apparatus such as a cellular phone apparatus has a narrow and small terminal screen. Therefore, when a web (World Wide Web) page for a Personal Computer (PC) is displayed, only limited information can be displayed. Moreover, the display state is poor in viewability. As such, since the web page for PC cannot be displayed as it is on a terminal screen, various techniques have been conventionally suggested so that a web page for PC is converted to a web page for a terminal and is displayed on a terminal screen. For example, Patent Document 1 discloses a technique in which, in response to a request from a mobile terminal apparatus, a Web server converts a web page for PC to a web page for a terminal for transmission to the terminal device.

PRIOR ART DOCUMENT

Patent Document

Patent Document 1: JP 2006-331342

SUMMARY OF INVENTION

Problem to be Solved by the Invention

Meanwhile, in the technique described above, a web page for PC is converted to a web page for a terminal on a Web server side. Even if the contents of the web page for PC and display positions of various contents are customized on a terminal device side so as to be easily usable by a user, it is difficult to understand which contents are present as contents that can be displayed during customization. Moreover, when a display position is changed, it is difficult to understand which content is to be selected and what adjacency relation is established with another content, and operations may become troublesome.

An object of the present invention is to easily achieve a change that reflects the intentions of the user when data for a screen with a large amount of information is changed to data for a screen with a small amount of information in response to an instruction from a user side.

Means for Solving the Problem

In order to solve the above-described problem, a mobile terminal apparatus according to the present invention is a mobile terminal apparatus capable of displaying data for a screen with a large amount of information as data for a screen with a small amount of information, the apparatus comprising:

a first display section which displays in a guide format overview data of the data for the screen with the large amount of information including a plurality of contents;

a selecting section which selects an arbitrary content from within the overview data displayed on the first display section; and a change control section which changes, every time a content is selected by the selecting section, the data for the screen with the large amount of information to the data for the screen with the small amount of information while arranging and displaying the selected content on a second display section.

In order to solve the above-described problem, a mobile communication system according to the present invention is a mobile communication system in which a mobile terminal apparatus capable of displaying data for a screen with a large amount of information as data for a screen with a small amount of information and a management device which stores and manages the data for the screen with the large amount of information are connected together via a communication network, the system comprising:

a first display section which displays in a guide format overview data of the data for the screen with the large amount of information including a plurality of contents transmitted from the management device;

a selecting section which selects an arbitrary content from within the overview data displayed on the first display section; and a change control section which changes, when the content selected by the selecting section is transmitted to the management device and the selected content is received from the management device, the data for the screen with the large amount of information to the data for the screen with the small amount of information while arranging and displaying the selected content on a second display section.

In order to solve the above-described problem, a mobile communication method according to the present invention is a mobile communication method comprising:

a step of displaying in a guide format overview data of data for a screen with a large amount of information including a plurality of contents on a first display section;

a step of selecting an arbitrary content from within the overview data displayed on the first display section; and a step of changing, every time the content is selected, the data for the screen with the large amount of information to data for a screen with a small amount of information while arranging and displaying the selected content on a second display section.

In order to solve the above-described problem, a program according to the present invention is based on a non-transitory computer-readable storage medium having a program stored thereon that is executable by a computer of a mobile terminal apparatus to perform functions comprising:

a function for displaying in a guide format overview data of data for a screen with a large amount of information including a plurality of contents on a first display section;

a function for selecting an arbitrary content from within the overview data displayed on the first display section; and a function for changing, every time the content is selected, the data for the screen with the large amount of information to data for a screen with a small amount of information while arranging and displaying the selected content on a second display section.

Effect of the Invention

According to the present invention, when data for a screen with a large amount of information is changed to data for a screen with a small amount of information in response to an instruction from a user side, a change that reflects the intentions of the user can be easily achieved, whereby usability is enhanced.

DESCRIPTION OF EMBODIMENTS

Hereinafter, the embodiments of the present invention will be described referring to FIG. 1 to FIG. 13.

Figure 1:
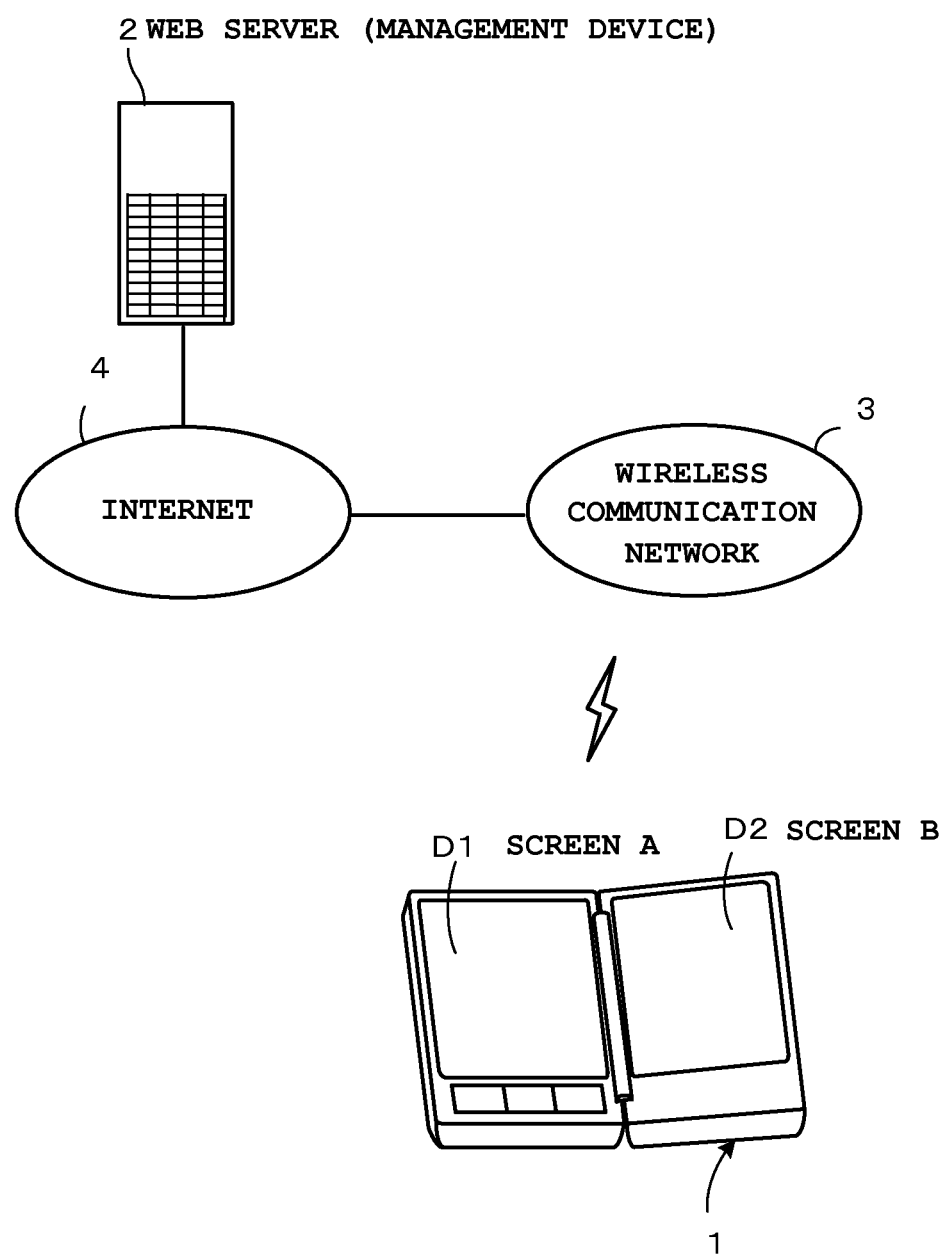
FIG. 1 is a block diagram depicting a communication network system (mobile communication system) that can be used by a cellular phone apparatus 1.

This embodiment is exemplified by a case where the present invention is applied as a communication terminal device to a cellular phone apparatus. FIG. 1 is a block diagram depicting a communication network system (mobile communication system) that can be used by a cellular phone apparatus.

The mobile communication system is configured to include a cellular phone apparatus 1 and a Web server (management device) 2. The cellular phone apparatus 1 includes a calling function, an electronic mail function, an Internet connection function (Web access function), and others. When the cellular phone apparatus 1 is connected to a wireless communication network (mobile communication network) 3, the cellular phone apparatus 1 becomes in a state where a call can be performed with another cellular phone apparatus (not shown) through this wireless communication network 3, and when the cellular phone apparatus 1 is connected to the Internet 4 through the wireless communication network 3, the cellular phone apparatus 1 becomes in a state where a web page can be viewed from the Web server (management device) 2.

To the Web server (management device) 2, a storage device 21 is connected, which stores and manages various web contents and, as will be described further below, stores and manages web page screen configuration data customized for each user. In response to a request for viewing from the cellular phone apparatus 1, a web page is transmitted to the requesting cellular phone apparatus 1. Note that the Web server 2 can support a social network service, and the cellular phone apparatus 1 is configured such that the web page can be viewed through a web page where information about the user registered in this service is described.

Figure 2:
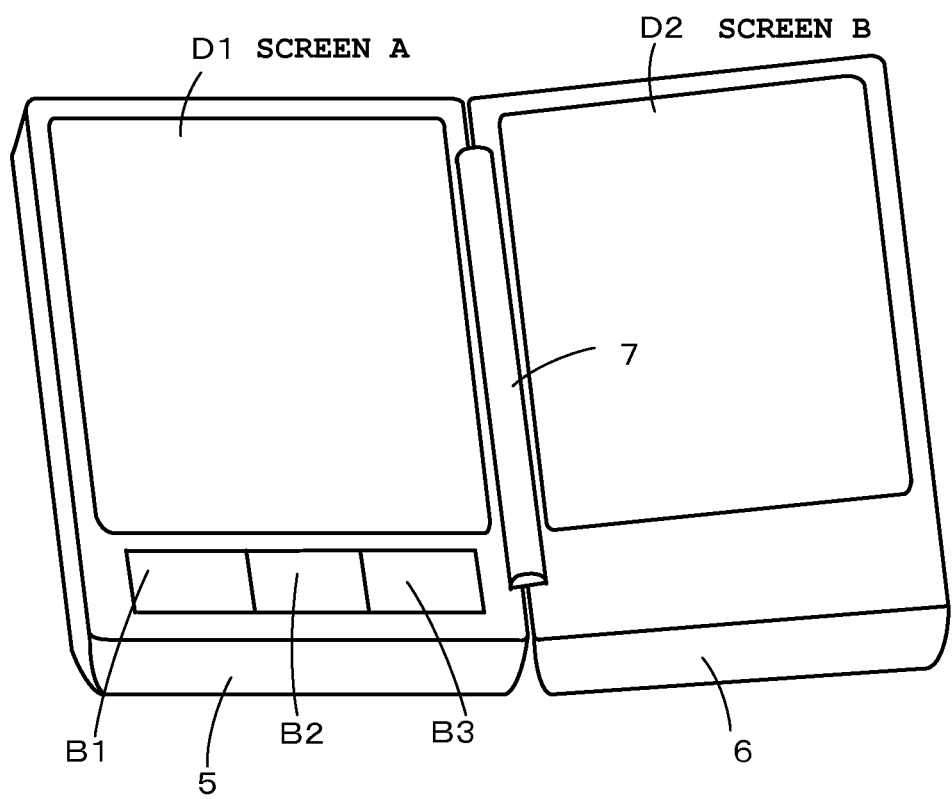
FIG. 2 is a diagram schematically depicting an outer appearance of the cellular phone apparatus 1.

FIG. 2 is a diagram schematically depicting an outer appearance of the cellular phone apparatus 1.

The cellular phone apparatus 1 is a foldable type (open-and-close type) cellular phone apparatus with a two-page-spread-type housing in which two housings respectively having a display section, that is, display section housings 5 and 6 are foldably mounted (so as to be openable and closable) via a hinge section 7. The display section housing 5 is a housing including a screen A D1, and the display section housing 6 is a housing including a screen B D2. These display section housings 5 and 6 are respectively composed of a rectangular parallelepiped of the same shape and size. Note that the screen A D1 and the screen B D2 are screens with an uneven aspect ratio, and are vertically long screens or horizontally long screens depending on whether the rectangular-parallelepiped display section housings 5 and 6 are vertically oriented or horizontally oriented. The example depicted in the drawing shows that the display section housings 5 and 6 are in a vertically oriented state and in a two-page-spread state. In this two-page-spread state, the screen A D1 and the screen B D2 are vertically long screens opened to right and left, with the screen A D1 positioned on the left side and the screen B D2 positioned on the right side.

The cellular phone apparatus 1 is configured such that two 15 application functions (web browsers) can be started corresponding to the screen A D1 and the screen B D2, and that web pages from the Web server (management device) 2 are displayed by these two browsers on the screen A D1 and the screen B D2. A touch panel (not shown) is arranged on a substantially entire front surface of each of the screen A D1 and the screen B D2, whereby a command input can be performed in response to a touch operation of the user. On a lower portion of the front surface of the display section housing 5, various press button type keys B1, B2, and B3 are arranged for user interface.

Figure 3:
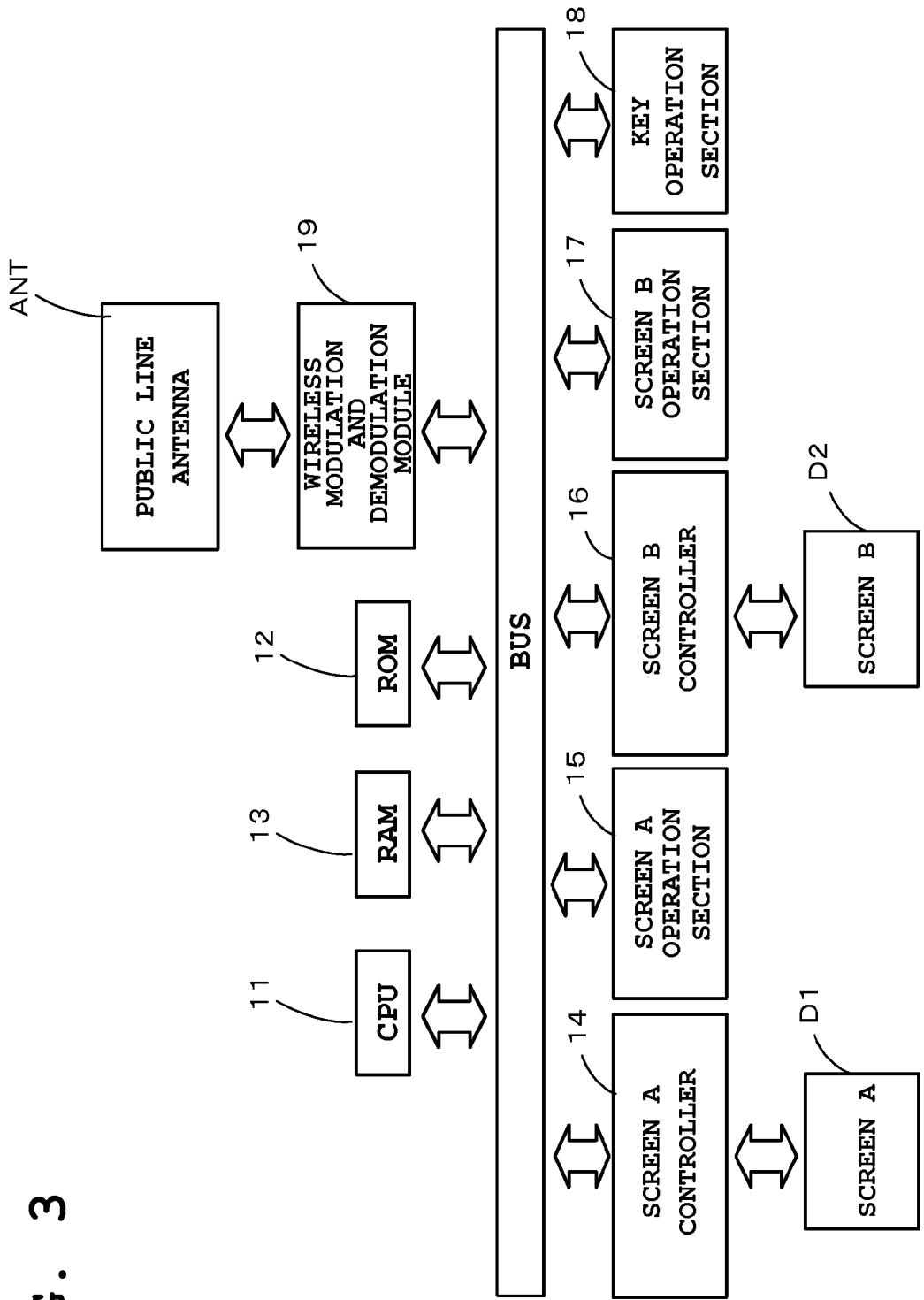
FIG. 3 is a block diagram depicting basic components of the cellular phone apparatus 1.

FIG. 3 is a block diagram depicting basic components of the cellular phone apparatus 1.

The cellular phone apparatus (mobile terminal apparatus) has a CPU 11 as a core. This CPU 11 operates by electric power supply from a secondary battery (not shown), and controls the entire operation of this cellular phone apparatus 1 in accordance with various programs in a ROM 12. The ROM 12 is a Read Only Memory which stores various control programs and fixed data to be executed by the CPU 11, and a non-volatile memory such as a flash memory may be used. A RAM 13 is a Random Access Memory, which retains data required when the CPU 11 executes a program and is used as a video RAM to retain data to be displayed on a screen or used as a work memory.

A screen A controller 14 reads out data to be displayed on the screen A D1 from a video RAM region of the RAM 13, and outputs picture data to the screen A D1 while adjusting timing. A screen A operation section 15 constitutes a touch screen, and is a touch operation section which inputs position information when a finger, stylus pen, or the like brings contact with a touch panel arranged on the screen A D1. Similarly, a screen B controller 16 reads out data to be displayed on the screen B D2 from a video RAM region of the RAM 13, and outputs picture data to the screen B D2 while adjusting timing. A screen B operation section 17 constitutes a touch screen, and is a touch operation section which inputs position information when a finger, stylus pen, or the like brings contact with a touch panel arranged on the screen B D2.

A key operation section 18 has the various keys B1, B2, and B3 described above, and provides an operation signal in response to a key operation to the CPU 11. A wireless modulation and demodulation module 19 is a communication section which modulates data sent from the cellular phone apparatus 1 and demodulates data received from the public line network in order to enable data exchange between the cellular phone apparatus 1 and the Web server 2 via a public line network (the wireless communication network 3, the Internet 4), and to which a public line antenna (antenna for transmission and reception) ANT is connected.

Figure 4:
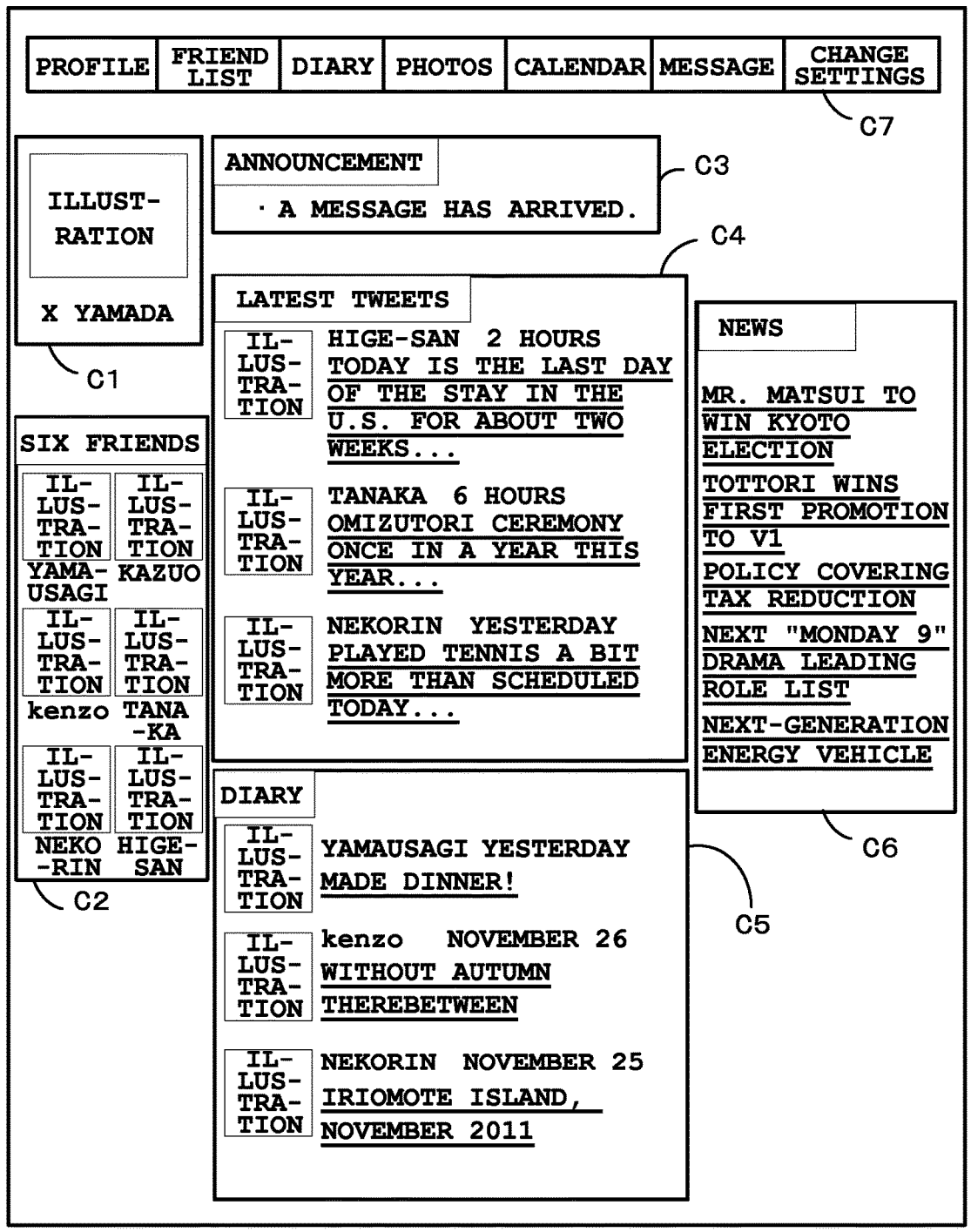
FIG. 4 is a diagram exemplarily depicting the case in which a web page for PC of a social network is displayed on a PC screen.

FIG. 4 is a diagram exemplarily depicting the case in which a web page for PC, which is used in a social network, is displayed on a PC screen.

The web page for PC is data for a screen with a large amount of information including a plurality of contents, and a plurality of contents C1 to C7 are arranged on this web page. Note that the content C1 indicates information (name and user's illustration) about a user who has logged in the social network. The content C2 indicates information (names and their illustrations) about other users registered as friends of the user indicated in the content C1 among users registered in the social network. The content C3 indicates announcement from the social network service to the logged-in user, for example, information such as a personal message to the logged-in user from another user.

The content C4 indicates information where short sentences called "tweets", which other users registered as friends of the logged-in user has written in the social network to transmit their current states, are chronologically arranged. The content C5 indicates information where diaries, which other users registered as friends of the logged-in user wrote, are chronologically arranged. The content C6 indicates links to news delivered by newspapers and broadcast stations via the Internet, and is information about current news topics. In the content C7, function buttons, in which their function names are listed such that the function buttons correspond to various functions selectable by a user operation, are horizontally arranged in line. When any one of the function buttons is operated, a transition is made to another screen for processing a function corresponding to the function button.

Figure 5:
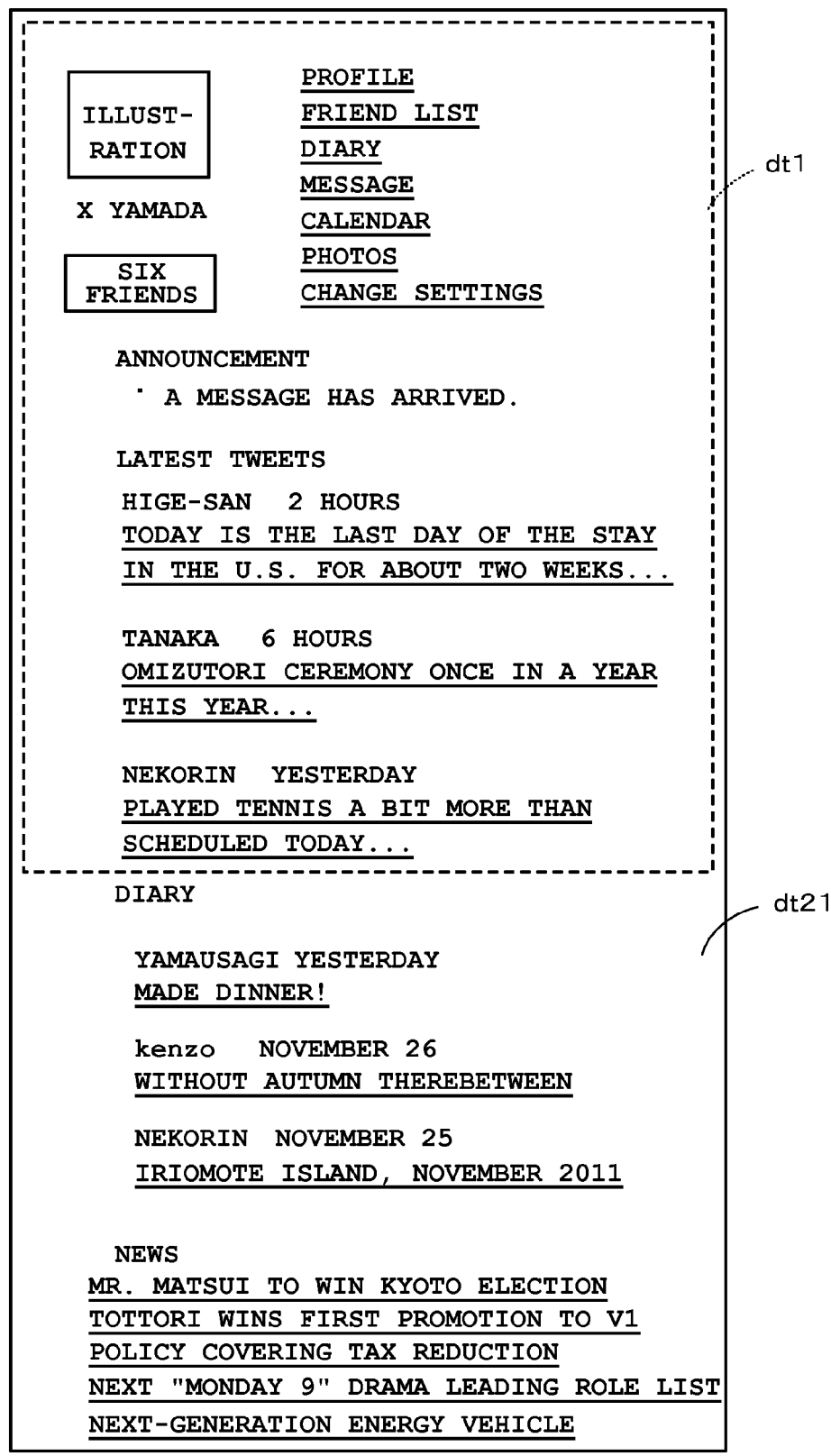
FIG. 5 is a diagram depicting web screen data that can be displayed when the web page for PC of FIG. 4 is accessed from a cellular phone apparatus 1 side.

FIG. 5 is a diagram depicting web screen data that can be displayed when the web page for PC of FIG. 4 is accessed from a cellular phone apparatus 1 side.

When the web page for PC of FIG. 4 is displayed as it is on the cellular phone apparatus 1, the amount of information is large, and therefore it is difficult to display the same information with exactly the same screen configuration. Moreover, if the entirety is reduced and displayed, the characters become small and difficult to read. Thus, for example, the details of each content is simplified to reduce the amount of information and the screen configuration is changed to web screen data for a terminal described in an abbreviated format. FIG. 5 is a diagram exemplarily depicting web screen data for a terminal obtained by such a change.

The entirety of the web screen data for the terminal of FIG. 5 has a vertically long shape, compared with the web page for PC of FIG. 4, and becomes data with a small amount of information, by omitting the illustrations of the friends and changing the arrangement state of the respective contents. Even so, it is difficult to display its entirety on the terminal screen. Therefore, only part of data (a portion surrounded by a broken line in the drawing), that is, substantially upper-half data dt1, is displayed, and the remaining substantially lower-half data dt2 is configured to be able to be displayed by a scroll operation.

That is, in a state where the substantially upper-half data dt1 is displayed on the screen A D1 or the screen B D2, when a touch operation (scroll operation) is performed on the screen A operation section 15 or the screen B operation section 17 of that screen to make an instruction for scroll display of undisplayed data, the CPU 11 instructs the screen A controller 14 or the screen B controller 16 to perform scroll display. The screen A controller 14 or the screen B controller 16 sequentially reads out the undisplayed data dt2 stored in a video RAM region of the RAM 13 and sequentially outputs the read-out data to the screen A D1 or the screen B D2, whereby scroll display of the undisplayed data dt2 is performed.

Figure 6:
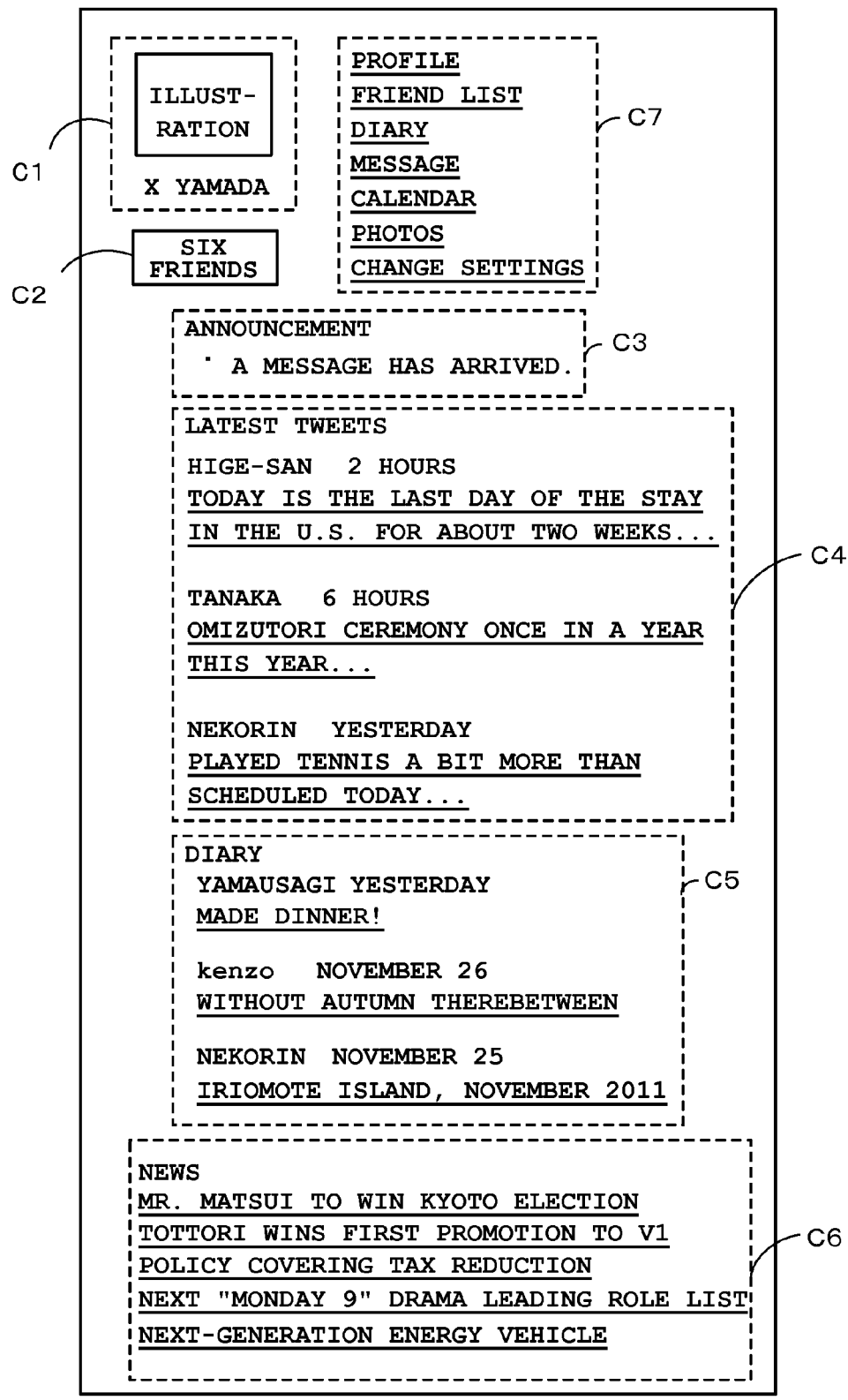
FIG. 6 is a diagram depicting screen data similar to the web screen data for a terminal depicted in FIG. 5.

FIG. 6 is a diagram depicting screen data similar to the web screen data for the terminal depicted in FIG. 5. However, FIG. 6 depicts a state where, as portions each surrounded by a broken line, the web screen data for the terminal is partitioned into blocks by configuration unit (by content). In this case, although the plurality of contents C1 to C7 arranged on the web screen data for the terminal correspond to the plurality of contents C1 to C7 arranged on the web page for PC depicted in FIG. 4, the details of the contents are described in an abbreviated format, for example, with the amount of information reduced or the screen configuration changed.

Figure 7:
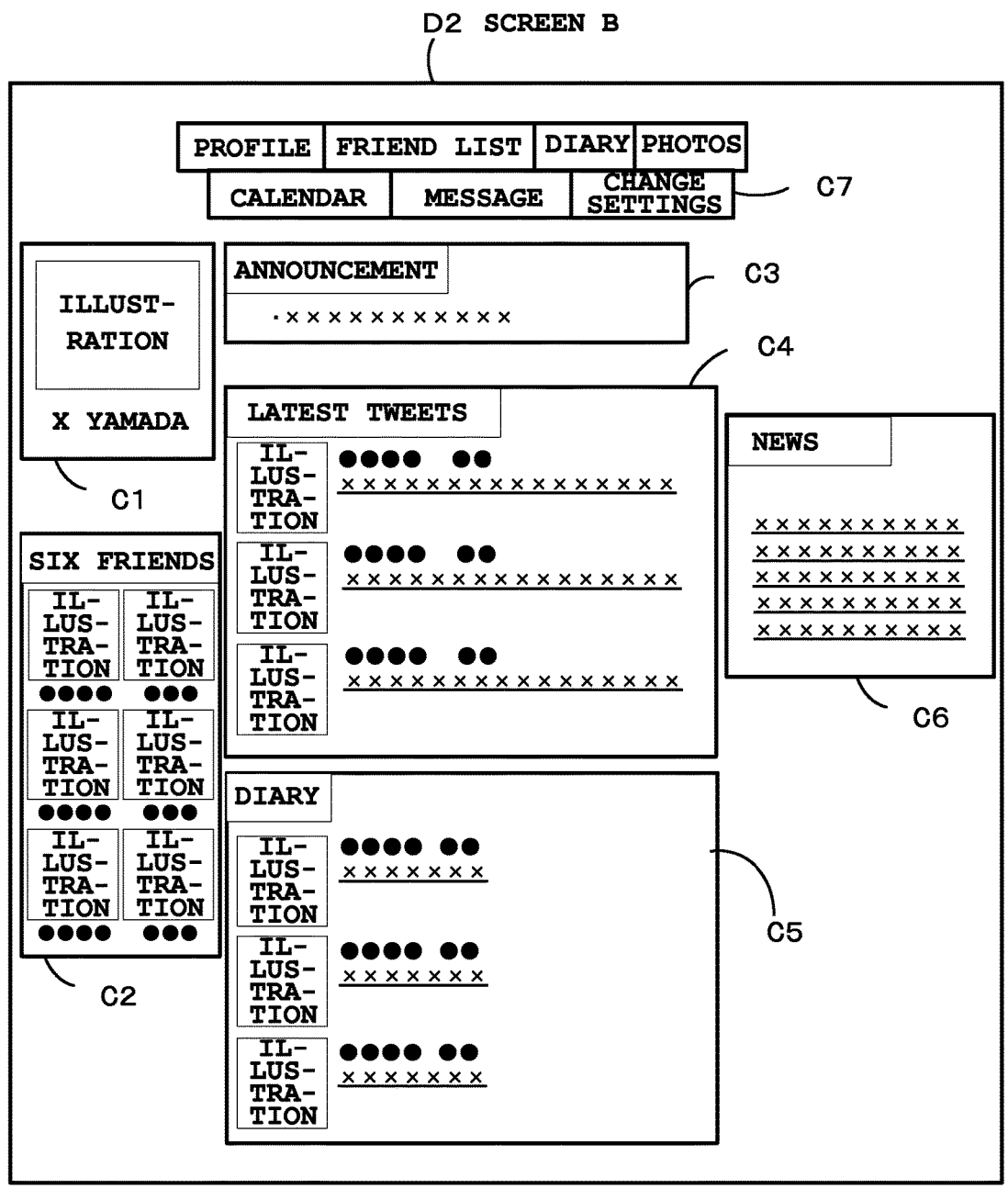
FIG. 7 is a diagram depicting a display state where an overview page of the web page for PC depicted in FIG. 4 is displayed on a screen B D2.

FIG. 7 is a diagram depicting an overview page of the web page for PC depicted in FIG. 4. The overview page is displayed on the screen B D2 when the web page for PC is customized along the intention of the user.

When the web page for PC of FIG. 4 is displayed as it is on the cellular phone apparatus 1, the amount of information is large, and therefore it is difficult to display the same information with exactly the same screen configuration. Moreover, if the entirety is reduced and displayed, the characters become small and difficult to read. Thus, for example, an unimportant portion of the web page for PC is reduced and whereby only the overview can be understood, and an important portion is left. FIG. 7 is a diagram exemplarily depicting the overview page obtained by a change (generated) based on the web page for PC, as described above. The entirety of this overview page is similar to the web page for PC of FIG. 4, and the plurality of contents C1 to C7 in the drawing correspond to the plurality of contents C1 to C7 arranged on the web page for PC depicted in FIG. 4.

In the overview page of FIG. 7, a user-readable font size is used for text of important portions of the respective contents, for example, the logged-in user name in the content C1, "friends" in the content C2, "announcement" in the content C3, "latest tweet" in the content C4, "diary" in the content C5, "news" in the content C6, and the content C7. As for other portions, reduced display is made so that only their overview can be understood because they are not important, or, in order to grasp only their images, for example, portions where characters are displayed are replaced by characters such as "x" or "•". With this, data for a screen with a large amount of information (web page for PC) is changed to a web page (overview page) representing an arrangement state of the respective contents constituting the data.

Figure 8:
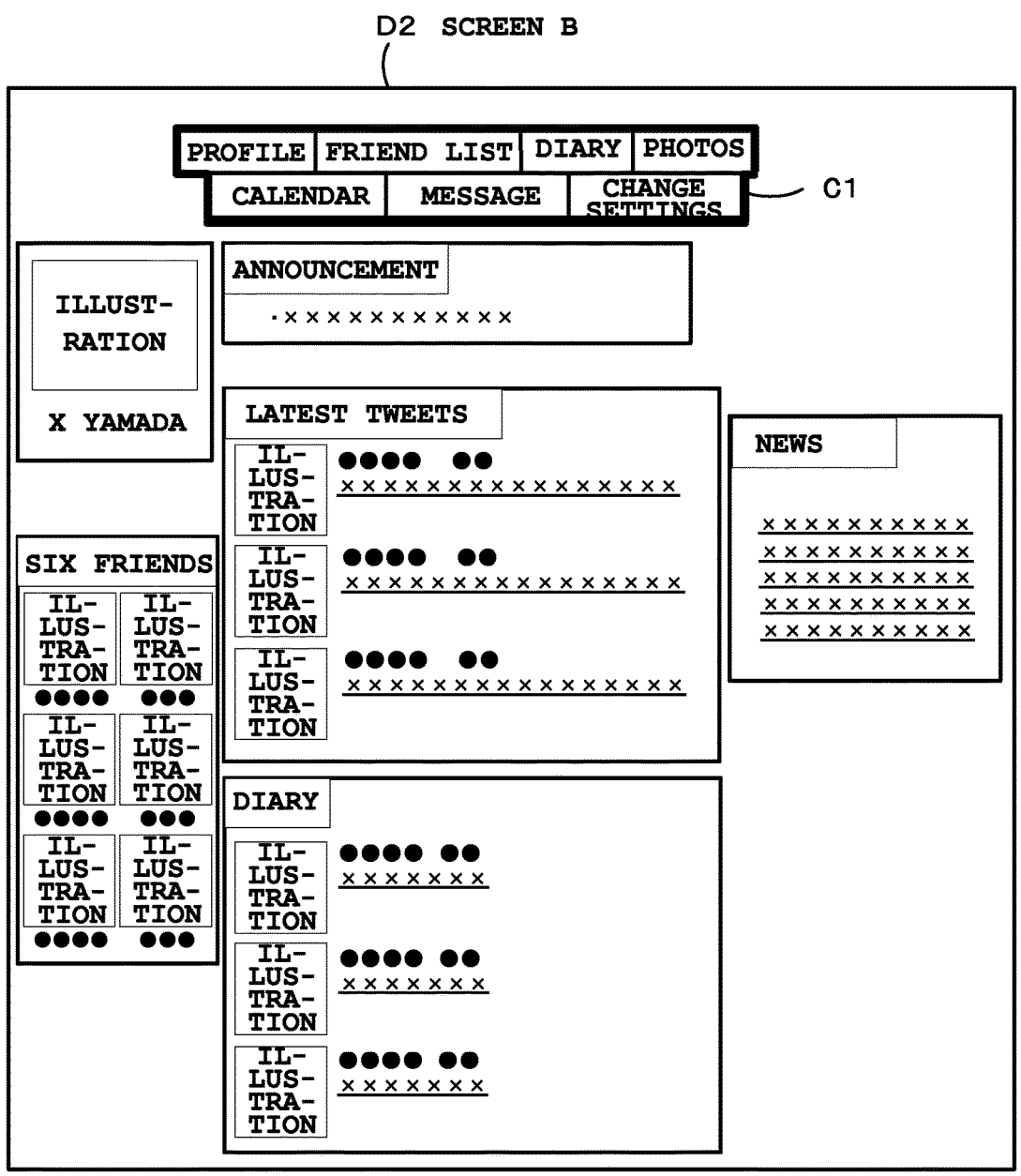
FIG. 8 is a diagram depicting a display state of the screen B D2 when a content desired by a user is selected from the overview page of FIG. 7.

FIG. 8 is a diagram depicting a display state of the screen B D2 when a content desired by the user is selected from the overview page of FIG. 7 in order that the web page for PC is customized into a web page along the intention of the user.

In the example depicted in the drawing, the case is exemplified in which the content C7 with various function buttons listed is selected as a desired content from among the plurality of contents C1 to C7 arranged on the overview page of FIG. 7. To identify and display the selected content, in the example depicted in the drawing, an outer frame portion indicating a block region of the content C7 is emphasized and displayed with a bold line.

Figure 9:
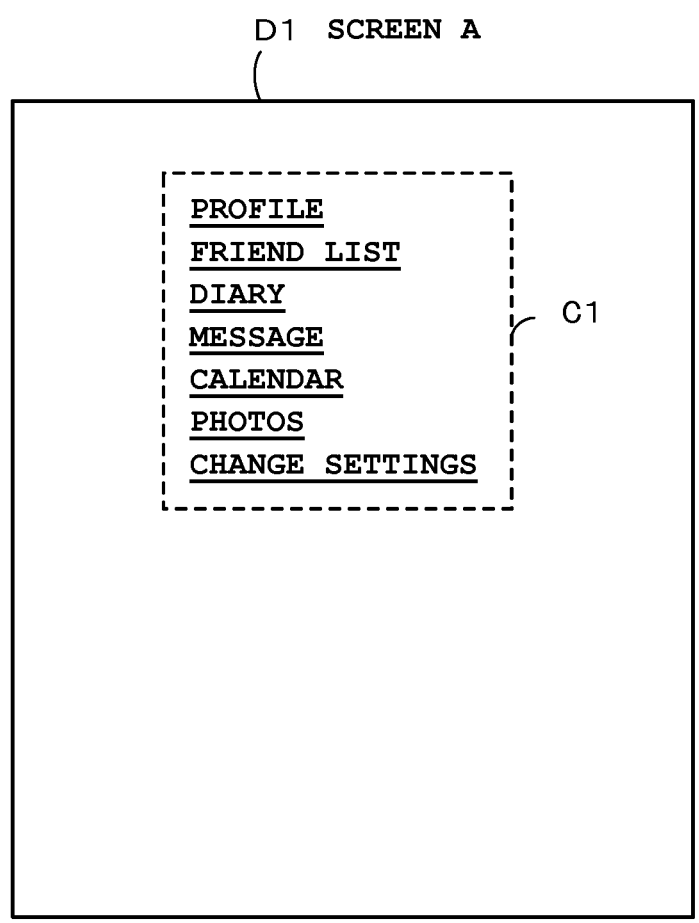
FIG. 9 is a diagram exemplarily depicting the state where an arbitrary content selected by the user as depicted in FIG. 8 is displayed on a screen A D1.

FIG. 9 is a diagram exemplarily depicting the state where the arbitrary content selected by the user as depicted in FIG. 8 is displayed on the screen A D1.

In the example of FIG. 8, the content C7 is selected, and therefore the selected content is displayed. At this time, the corresponding content in the web screen data for the terminal depicted in FIG. 6 are displayed. That is, the content C7 indicates data with various function buttons listed and, while the various function buttons are horizontally arranged in line in the web page for PC as depicted in FIG. 4, the various function buttons are vertically arranged in the web screen data for the terminal as depicted in FIG. 6, whereby the data of the content C7 is made horizontally compact. This horizontally compact data is displayed as the selected content.

Figure 10:
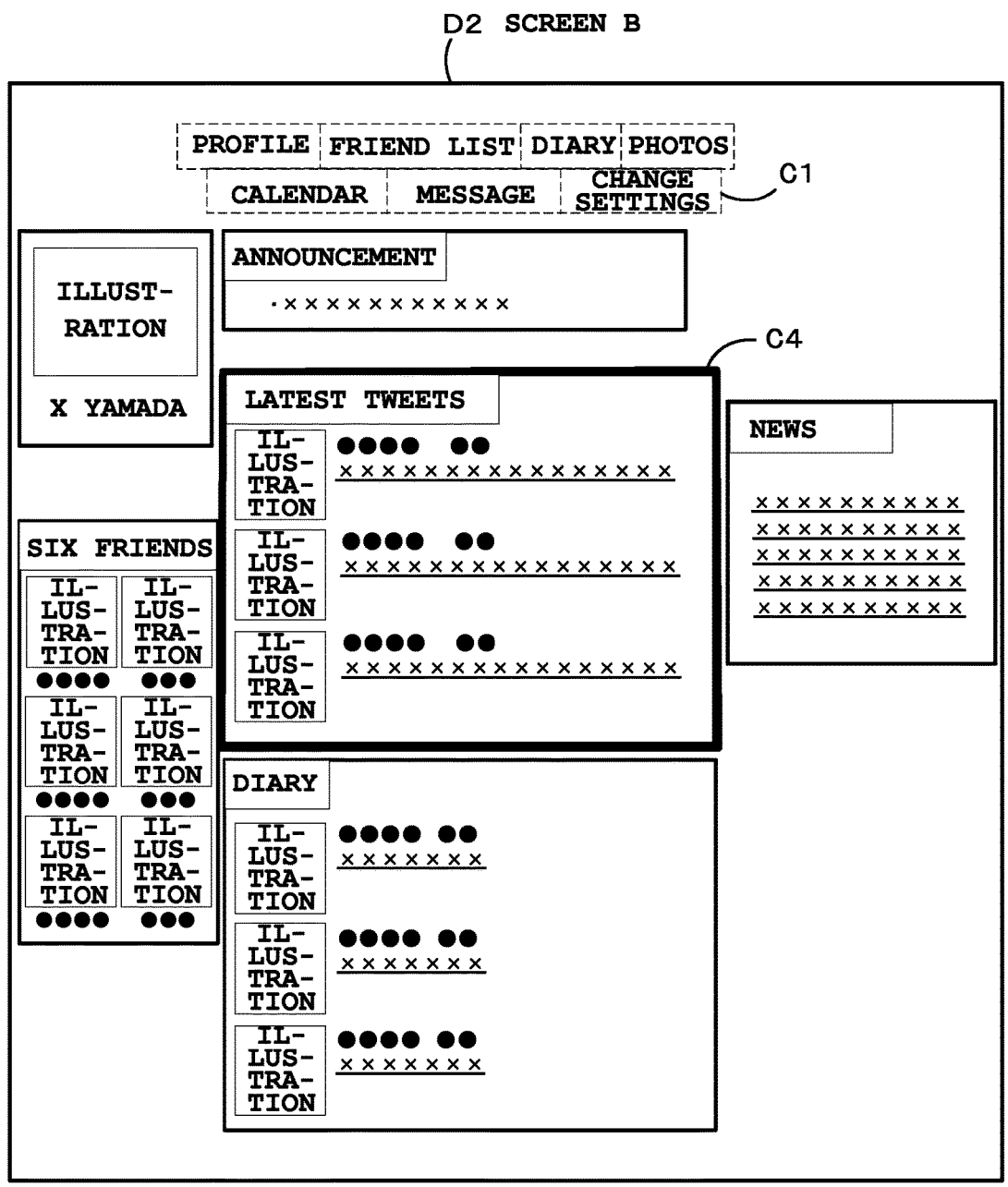
FIG. 10 is a diagram depicting a display state when another content is further selected subsequently to the case of FIG. 7.

FIG. 10 is a diagram depicting a display state when another content is further selected subsequently to the case of FIG. 7.

In this case, to remove the previously selected content C7 from selection candidates, that is, to make that content inconspicuous, the display color of its entirety becomes pale. In this state, in the example depicted in the drawing, when the content C4, in which "recent tweets" are listed, is selected as the next content, an outer frame portion indicating a block region of the content C4 is emphasized and displayed with a bold line to identify and display that selected content.

Figure 11:
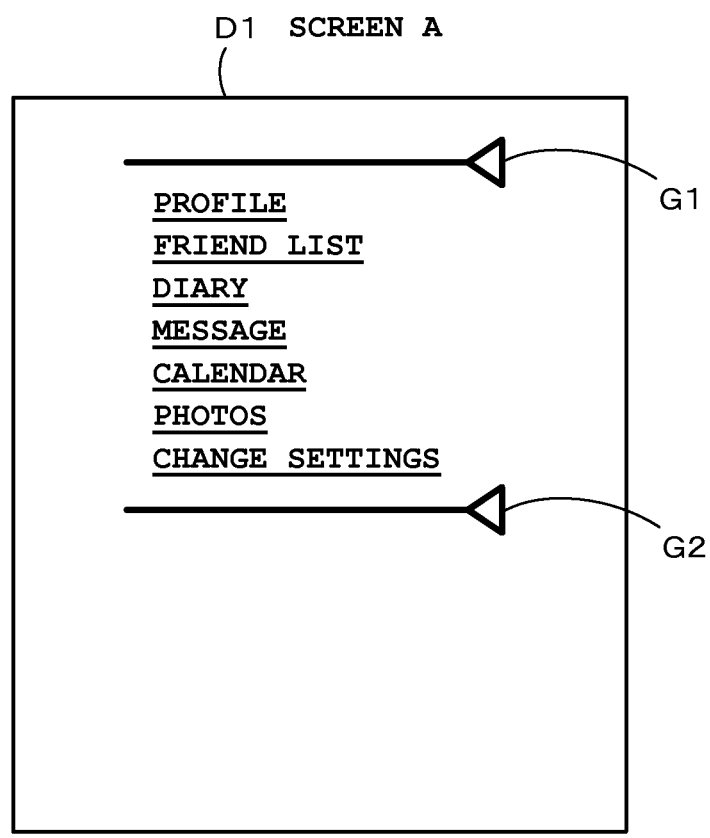
FIG. 11 is a diagram of the state where guides (indication bars) for guiding a position of a currently-selected content to be arranged with respect to a previously-selected content are displayed on the screen A D1.

FIG. 11 is a diagram of the state where, when the content is selected as depicted in FIG. 10, guides (indication bars) for guiding a position of a currently-selected content to be arranged with respect to a previously-selected content are displayed on the screen A D1.

In the example depicted in the drawing, guides (indication bars) G1 and G2 are arranged in an up and down direction of the previously-selected content C7. When either one indication bar is selected by a user operation, from out of the indication bar G1 arranged on an upper side and the indication bar G2 arranged on a lower side, the currently-selected content is displayed on the screen A D1 at the arrangement position of the selected indication bar. Note that the guides (indication bars) G1 and G2 are not limited to be arranged in an up and down direction of the previously-selected content C7, and the guides may be arranged in an up and down, right and left, or diagonal direction within a range in the screen A D1.

Figure 12:
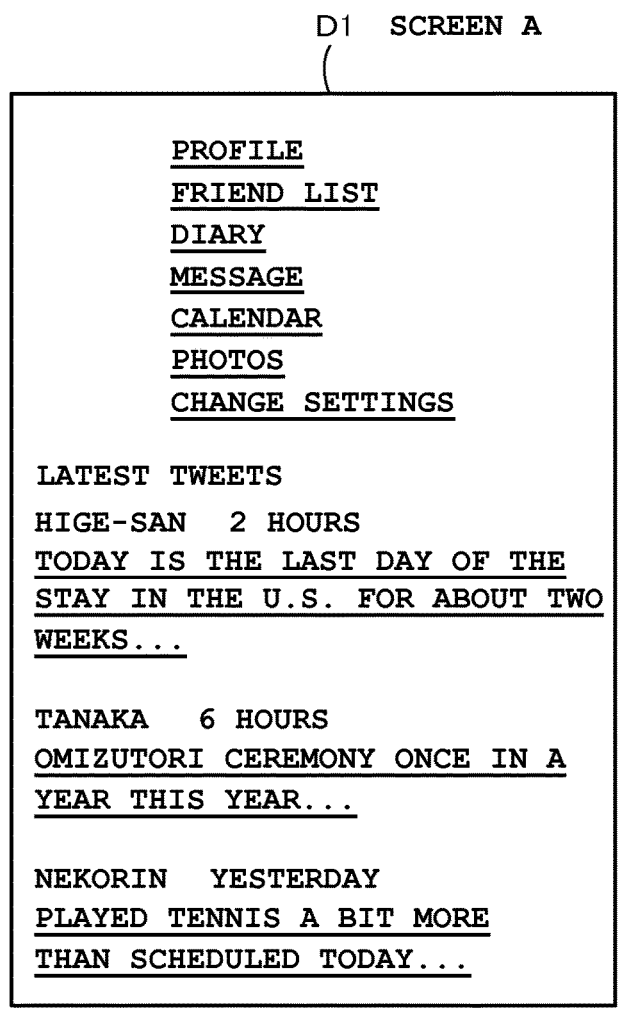
FIG. 12 is a diagram of a display state of the screen A D1 where, when a lower indication bar is selected from out of the guides (indication bars), a currently-selected content C4 is arranged at the position of the indication bar.

FIG. 12 is a diagram of a display state of the screen A D1 where, when the lower indication bar G2 is selected from out of the guides (indication bars) G1 and G2, the currently-selected content C4 is arranged at the position of the indication bar G2.

In this case, although the content C4 on the web page for PC contains an illustration for each friend as depicted in FIG. 4, the illustration for each friend is omitted in the content C4 on the web page for the terminal as depicted in FIG. 6. As a result, the data in this abbreviated format is arranged and displayed at the position of the indication bar G2 as the selected content. With this, the generated data becomes data for a screen with a small amount of information.

As described above, the user customizes the web page for PC to the page configuration that reflects the intentions of the user. This customized page configuration is stored and managed on a Web server 2 side. In this state, when a request for viewing the web page comes from the same user, the Web server 2 changes the requested web screen page to a customized page configuration as described above for transmission to the cellular phone apparatus 1 as data for a screen with a small amount of information.

Next, operations to be sequentially executed between the cellular phone apparatus 1 and the Web server 2 in the present embodiment will be described with reference to a sequence depicted in FIG. 13. Here, each function described in this sequence is stored in a readable program code format, and the operations are sequentially executed in accordance with the program codes. Note in the drawing that Steps "A01" to "A26" represent an operation procedure between the cellular phone apparatus 1 and the Web server 2, and the operations are performed in this numerical order.

It is assumed that the user is viewing a web page on the screen A D1 and data dt1 of the broken-line portion in FIG. 5 is displayed on the screen A D1. In this state, when desiring to change the configuration of the web page being displayed, the user touches the screen A D1, and a menu for changing the page configuration is displayed, whereby the user makes an instruction for changing the page configuration.

By the user touching the screen A D1, an input detail from the user is transmitted from the screen A operation section 15 to the CPU 11. Based on the input detail from the user, the CPU 11 reads out menu picture data from the ROM 12 and writes the read-out data in the video RAM region in the RAM 13. The picture data in this video RAM region is read out by the screen A controller 14 and then outputted to the screen A D1. With this, a menu for changing the page configuration is displayed on the screen A D1. Here, also when the user touches the menu for changing the page configuration, a request for changing the page configuration is transmitted from the user to the CPU 11 with a similar operation.

Figure 13:
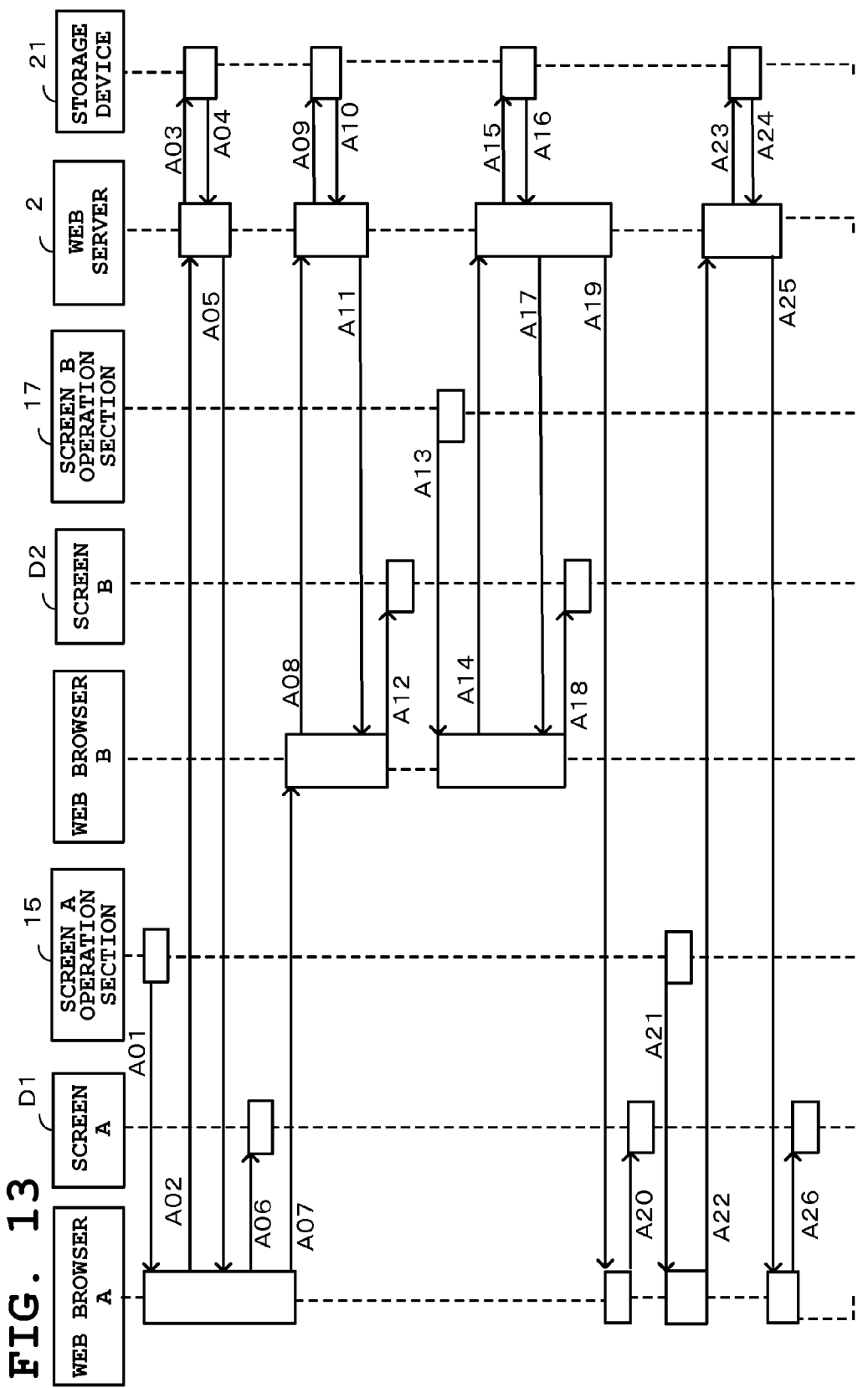
FIG. 13 is a diagram of an operation sequence sequentially executed between the cellular phone apparatus 1 and a Web server 2.

In FIG. 13, Step "A01" represents a request for changing the page configuration from the user. This request for changing the page configuration is received by web browser software displayed on the screen A D1. Based on this request, the web browser software notifies the Web server 2 that a request for changing the page configuration has come (Step A02). In this case, the CPU 11 sends data of the request for changing the page configuration to the wireless modulation and demodulation module 19, and the data modulated therein is sent to the Web server 2.

The Web server 2 that has received this data of the request for changing the page configuration requests a screen for changing the page configuration (web screen data) from the accompanying storage device 21 (Step A03) and, in response, the screen for changing the page configuration is sent from the storage device 21 (Step A04). This screen for changing the page configuration is sent from the Web server 2 to the web browser of the screen A D1 of the cellular phone apparatus 1 (Step A05). Based on this screen for changing the page configuration, web screen data is generated, and this web browser then outputs the web screen data to the screen A D1 (Step A06).

In this case, the screen for changing the page configuration sent from the Web server 2 is demodulated by the wireless modulation and demodulation module 19, and then the CPU 11 is notified of data reception. The CPU 11 transfers this data for changing the configuration to the RAM 13, constructs a web screen based on the configuration data, and stores screen data in a video RAM region on the RAM 13. Picture data in this video RAM region is read out by the screen A controller 14 and is then outputted to the screen A D1. With this, the screen for changing the page configuration will be displayed on the screen A D1. At this point, however, the screen for changing the page configuration is in a state of being not displayed at all.

Next, a notification is made indicating the start of a web browser operating on the screen B D2 (Step A07). This notification is sent together with the web screen configuration data from the Web server 2, and also includes a URL address of a web page to be displayed by the web browser for the screen B D2. With this, the started web browser of the screen B D2 accesses this URL address to request web screen data (Step A08). This URL address is an address created for changing the page configuration, and represents a screen which the user uses to select a content at the time of changing the page configuration. An operation when this web browser of the screen B D2 requests web screen data is identical to that described above when the web browser of the screen A D1 sends the data of the request for changing the page configuration to the Web server 2, and therefore is not described herein.

The Web server 2 that has received the request for web screen data requests a web page for PC serving as a base when displayed on the screen B D2 from the storage device 21 (Step A09). In response, the web page for PC is outputted from the storage device 21 (Step A10). Note that, since this web page is of data for PC with a large amount of information, the Web server 2 reduces an unimportant portion of this web page and whereby only an overview can be understood, and an important portion is left. As such, the web page for PC is subjected to conversion to generate a web page (overview page) as depicted in FIG. 7, and the generated web page is sent to the web browser of the screen B D2 (Step A11). Based on this web page (overview page), this web browser of the screen B D2 generates a web screen, and then the web screen is outputted to the screen B D2 (Step A12).

In this case, the web screen data (overview page) sent from the Web server 2 is demodulated by the wireless modulation and demodulation module 19, and then the CPU 11 is notified of data reception. The CPU 11 transfers this overview page to the RAM 13, constructs a web screen based on that data, and stores this screen data in a video RAM region on the RAM 13. Picture data in this video RAM region is readout by the screen B controller 16, and is then outputted to the screen B D2. As a result, the overview page created based on the web page for PC of FIG. 7 is displayed on the screen B D2. From the above-described operations, the screen for changing the page configuration will be displayed on the screen A D1, and the web page (overview page, hereinafter referred to as a screen for user selection) created based on the web page for PC will be displayed on the screen B D2. In this state, nothing is displayed yet on the screen for changing the page configuration.

Next, an operation when the web page for PC is customized to web screen data for a terminal by using these two screens (the screen for changing the page configuration and the screen for user selection) is described.

The user touches with his or her finger the screen B D2 and select a content desired to be first arranged from within the screen for user selection (overview page) of FIG. 7 displayed on the screen B D2. Now, if the content C7 is assumed to be selected, a selection notification is sent from the screen B operation section 17 to the web browser of the screen B D2 (Step A13). Based on this notification, the web browser notifies the Web server 2 that the content C7 has been selected (Step A14). Note that the operation of notifying the Web server 2 is similar to that described above when the data of the request for changing the page configuration is sent to the Web server 2, and therefore is not described herein. The Web server 2 generates a web page as depicted in FIG. 8 by identifying and displaying the content C7 (emphasizing with a bold line) so that the content C7 selected by the user can be visually recognized.

In order to generate such a web page, the Web server 2 requests data with the content C7 emphasized from the storage device 21 (Step A15). In response, the storage device 21 outputs that web page (Step A16), and this web page is sent from the Web server 2 to the web browser of the screen B D2 (Step A17). Based on this web page, the web browser of the screen B D2 generates a web page, and outputs the generated web page to the screen B D2 (Step A18). With this, the web page with the content C7 portion emphasized is displayed on the screen B D2.

Then, in response to the selection of the content C7, the selected content is displayed on the screen A D1. That is, in response to the notification from the web browser of the screen B D2 that the content C7 has been selected (Step A14), the Web server 2 sends the web screen data of FIG. 9 to the web browser of the screen A D1 so as to display the web screen data depicted in FIG. 9 corresponding to the content C7 as a page configuration change screen on the screen A D1 (Step A19). Based on this web screen data, the web browser of the screen A D1 constructs a web screen and outputs the web screen to the screen A D1 (Step A20). As such, when the user selects an arbitrary content on the screen for user selection displayed on the screen B D2, a content shaped for the terminal screen such that the content corresponds to the selected content is displayed as a page configuration change screen on the screen A D1.

Next, for example, an operation when another content C4 is arranged below the content C7 of FIG. 9 is described. Now, when the content C4 displayed on the screen for user selection is touched and selected with a finger, a notification of selection of the content C4 is made from the screen B operation section 17 to the web browser of the screen B D2 (Step A13). Thus, this web browser notifies the Web server 2 that the content C4 has been selected (Step A14). In this case, the Web server 2 generates a web page as depicted in FIG. 10 by identifying and displaying the content C4 (emphasizing with a bold line) so that the content C4 selected by the user can be visually recognized. In this case, the display color of the previously selected content C7 becomes pale in order to indicate a non-selected state (already selected). This web page is obtained from the storage device 21, and is sent to the web browser of the screen B D2. Based on the web page data, this web browser generates a web page, and outputs the generated web page to the screen B D2.

By the content C4 selected as described above, location candidates where this selected content can be arranged are displayed on the screen A D1. In this method, in response to the notification from the web browser of the screen B D2 that the content C4 has been selected, the Web server 2 sends the web page of FIG. 11 to the web browser in order to display on the screen A D1 the web page as described in FIG. 11, in which the indication bars G1 and G2 for indicating locations where the content C4 can be arrange is displayed (Step A19). Based on that data, the web browser of the screen A D1 constructs a web screen, and outputs its screen data to the screen A D1 (Step A20). With this, on the screen for user selection displayed on the screen B D2, when the user selects a content on the screen B D2, a web screen in which location candidates where the selected content can be arranged are shown as indication bars, is displayed on the screen A D1 as a screen for changing the page configuration.

From among the location candidates where the content C4 can be arranged, the user selects the location where the user desires to arrange. Here, the user touches either one of the indication bars G1 and G2 displayed on the screen A D1 with a finger. With this selection, a notification of indication bar selection is made from the screen A operation section 15 to the web browser of the screen A D1 (Step A21). Based on this notification, the web browser notifies the Web server 2 that the indication bar G2 has been selected (Step A22). The Web server 2 generates a web page as depicted in FIG. 12 in which the content C4 is arranged at the position of the indication bar selected by the user.

To generate data of this web page, the Web server 2 requests the web page of FIG. 12 from the storage device 21 (Step A23), and the storage device 21 outputs the web page (Step A24). Also, in the storage device 21, arrangement information of the user-selected content is recorded and stored. This web page is sent from the Web server 2 to the web browser of the screen A D1 (Step A25). The web browser of this screen A D1 generates a web screen based on the web page, and outputs the generated screen to the screen A D1 (Step A26). By repeating the above, a web page for the terminal as depicted in FIG. 6 is eventually created as desired by the user.

When the cellular phone apparatus 1 transmits an arrangement state of the respective contents displayed on the screen A D1 as page configuration change data to the Web server 2 and instructs the Web server 2 to register and store the data, the Web server 2 registers and stores the page configuration change data in the storage device 21 in association with the user. As such, in a state where the page configuration change data (the arrangement state of the contents) is registered and stored, when the web page is requested by the same user, the Web server 2 reconstructs the web page based on the page configuration change data registered and stored in association with the user, and transmits the reconstructed data to the web browser of the cellular phone apparatus 1.

As described above, in the present embodiment, the cellular phone apparatus 1 includes the screen A D1 and the screen B D2 and, every time an arbitrary content is selected in a state where the overview of data for a screen with a large amount of information is displayed for guide on the screen B D2 (screen for user selection), the cellular phone apparatus 1 changes the data for the screen with the large amount of information to data for a screen with a small amount of information while arranging and displaying the selected content on the screen A D1. Therefore, a change that reflects the intentions of the user can be easily achieved while comparing the screen A D1 and the screen B D2 with each other, whereby usability is enhanced.

Every time a content is selected, the cellular phone apparatus 1 obtains the selected content from the Web server 2 and, changes the data for the screen with a large amount of information to data for a screen with a small amount of information while arranging and displaying the selected content on the screen A D1. Therefore, each content on the web page can be arranged according to the user's taste.

The web browser corresponding to the screen A D1 and the web browser corresponding to the screen B D2 are further provided, and a request from either one of the web browsers is pressed to the other web browser via the Web server 2. With this, data transmission and reception is performed with the Web server 2. Therefore, a web page for PC (data for a screen with a large amount of information) can be changed to a web page for the terminal (data for a screen with a small amount of information) by using the existing web browser, without using a dedicated application.

The cellular phone apparatus 1 transmits the arrangement state of the respective contents displayed on the screen A D1 as page configuration change data to the Web server 2, and instructs the Web server 2 to register and store the data. Therefore, when the web page is requested from the same user after the page configuration change data (the arrangement state of the contents) is registered and stored, the Web server 2 can reconstruct the web page based on the page configuration change data registered and stored in association with the user, and can return the reconstructed data to the web browser of the cellular phone apparatus 1. The user can view the web page in the arrangement state according to the user's taste freely anytime.

The cellular phone apparatus 1 also displays in a guide format the arrangement state of the respective contents constituting the data for the screen with a large amount of information (web page for PC), and describes details of at least any one of the contents in an abbreviated format. With this, the overview of the data for the screen with a large amount of information can be displayed for guide.

When an arbitrary content is selected in a state where the overview of the data for the screen with a large amount of information is displayed on the screen B D2 (screen for user selection) for guide, the cellular phone apparatus 1 identifies and displays the selected content, and also identifies and displays an already-selected content. Therefore, a selecting operation is facilitated.

When arranging and displaying content on the screen A D1 every time the content is selected, the cellular phone apparatus 1 displays in a guide format positions where the content can be arranged as selection candidates. Also, when an arbitrary candidate is selected therefrom, the selected content is arranged and displayed at the position of the selection candidate. Therefore, the arrangement position can be determined according to the guide for the positions where the content can be arranged, and an arranging operation is facilitated.

Note in the above-described embodiment, every time a content is selected, the respective positions where the content can be arranged are displayed for guide as selection candidates and, when an arbitrary candidate is selected therefrom, the selected content is arranged and displayed at the position of the selected candidate. Alternatively, the selected content may be arranged and displayed at an arbitrary position specified by a user operation. In this case, the selected content may be reduced or deformed to be arranged and displayed.

Also, in the above-described embodiment, the screen A D1 and the screen B D2 are configured to be physically separated. Alternatively, a logically separated relation may be possible, such as a main screen and a sub-screen.

Furthermore, in the above-described embodiment, cellular phone apparatus 1 is configured to be connected to the Web server (management device) 2 via a public line network. Alternatively, an application with a Web server function may be operated on cellular phone apparatus 1 side to perform a similar operation.

In the above-described embodiment, the present invention is applied to a cellular phone apparatus as a mobile terminal apparatus, but a digital camera (compact camera), a PDA (personal, portable information communication equipment), a tablet terminal device, a cellular phone apparatus other than a smartphone, an electronic game machine, a music player, or the like may be applied.

Yet still further, the "devices" or the "sections" described in the above-described embodiments are not required to be in a single housing and may be separated into a plurality of housings by function. In addition, the steps in the above-described flowchart are not required to be processed in time-series, and may be processed in parallel, or individually and independently.

This application is based upon and claims the benefit of priority from the prior Japanese Patent Application No. 2012-091923 filed on Apr. 13, 2012, the entire contents of which are incorporated herein by reference.

A part or all of the above-described embodiments can be described as described in the following Supplementary Notes, however, the embodiments are not limited to the Supplementary Notes. Hereinafter, several embodiments the present invention are summarized in the Supplementary Notes described below.

(Supplementary Note 1)

Figure 14:
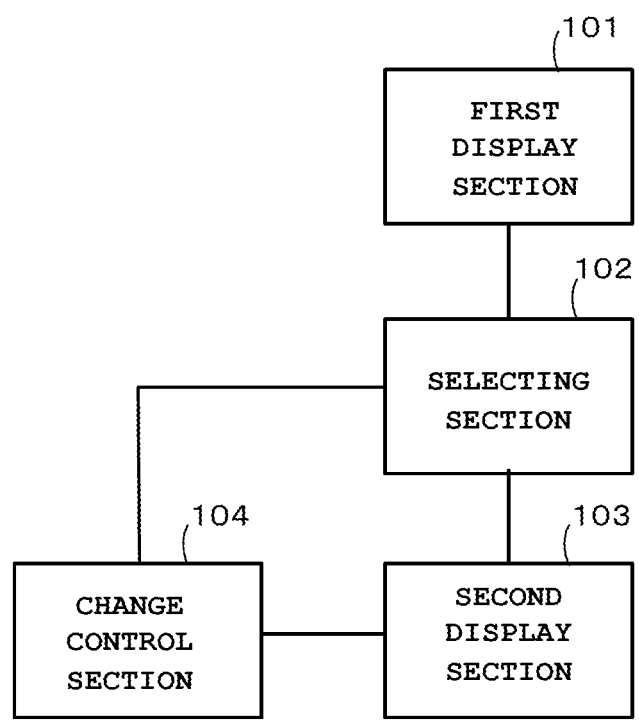
FIG. 14 is a diagram for describing Supplementary Note 1.

FIG. 14 is a configuration diagram according to Supplementary Note 1. As depicted in this drawing, the invention described in Supplementary Note 1 provides a mobile terminal apparatus capable of displaying data for a screen with a large amount of information as data for a screen with a small amount of information, the apparatus including:

a first display section 101 (in FIG. 3, the CPU 11, the screen B controller 16, the screen B D2, the ROM 12, the RAM 13) which displays in a guide format overview data of the data for the screen with the large amount of information including a plurality of contents;

a selecting section 102 (in FIG. 3, the CPU 11, the screen B operation section 17, the ROM 12, the RAM 13) which selects an arbitrary content from within the overview data displayed on the first display section 101; and a change control section 104 (in FIG. 3, the CPU 11, the ROM 12, the RAM 13) which changes, every time a content is selected by the selecting section 102, the data for the screen with the large amount of information to the data for the screen with the small amount of information while arranging and displaying the selected content on a second display section 103 (in FIG. 3, the CPU 11, the screen A controller 14, the screen A D1, the ROM 12, the RAM 13).

(Supplementary Note 2)

The mobile terminal apparatus according to Supplementary Note 1, further comprising:

a communicating section which connects via a communication network a management device which stores and manages the data for the screen with the large amount of information, wherein the change control section, every time a content is selected by the selecting section, obtains the selected content from the management device via the communicating section and changes the data for the screen with the large amount of information to the data for the screen with the small amount of information while arranging and displaying the selected content on the second display section.

(Supplementary Note 3)

The mobile terminal apparatus according to Supplementary Note 2, further comprising:

a first web browser corresponding to the first display section and a second web browser corresponding to the second display section, wherein the communicating section performs data transmission and reception with the management device by pressing a request from either one of the web browsers to another web browser via the communication network and the management device.

(Supplementary Note 4)

The mobile terminal apparatus according to Supplementary Note 2, wherein the communicating section transmits, via the communication network to the management device, an arrangement state of respective contents displayed on the second display section by the change control section as a page configuration change screen, and makes an instruction for registering and storing the page configuration change screen.

(Supplementary Note 5)

The mobile terminal apparatus according to Supplementary Note 1, wherein the first display section also displays in a guide format an arrangement state of the respective contents constituting the data for the screen with the large amount of information, and describes details of at least any one of the contents in an abbreviated format.

(Supplementary Note 6)

The mobile terminal apparatus according to Supplementary Note 1, wherein the first display section, when another arbitrary content is selected by the selecting section, identifies and displays the selected content and also identifies and displays an already-selected content.

(Supplementary Note 7)

The mobile terminal apparatus according to Supplementary Note 1, wherein the change control section, when arranging and displaying a content on the second display section every time the content is selected by the selecting section, displays in a guide format positions where the content can be arranged as selection candidates, and, when an arbitrary candidate is selected therefrom, arranges and displays the content selected by the selecting section at the position of the selected candidate.

(Supplementary Note 8)

A mobile communication system in which a mobile terminal apparatus capable of displaying data for a screen with a large amount of information as data for a screen with a small amount of information and a management device which stores and manages the data for the screen with the large amount of information are connected together via a communication network, the system comprising:

a first display section which displays in a guide format overview data of the data for the screen with the large amount of information including a plurality of contents transmitted from the management device;

a selecting section which selects an arbitrary content from within the overview data displayed on the first display section; and a change control section which changes, when the content selected by the selecting section is transmitted to the management device and the selected content is received from the management device, the data for the screen with the large amount of information to the data for the screen with the small amount of information while arranging and displaying the selected content on a second display section.

(Supplementary Note 9)

A mobile communication method comprising:

a step of displaying in a guide format overview data of data for a screen with a large amount of information including a plurality of contents on a first display section;

a step of selecting an arbitrary content from within the overview data displayed on the first display section; and a step of changing, every time the content is selected, the data for the screen with the large amount of information to data for a screen with a small amount of information while arranging and displaying the selected content on a second display section.

(Supplementary Note 10)

A non-transitory computer-readable storage medium having a program stored thereon that is executable by a computer of a mobile terminal apparatus to perform functions comprising:

a function for displaying in a guide format overview data of data for a screen with a large amount of information including a plurality of contents on a first display section;

a function for selecting an arbitrary content from within the overview data displayed on the first display section; and a function for changing, every time the content is selected, the data for the screen with the large amount of information to data for a screen with a small amount of information while arranging and displaying the selected content on a second display section.

(Supplementary Note 10)

A non-transitory computer-readable storage medium having a program stored thereon that is executable by a computer of a mobile terminal apparatus to perform functions comprising:

a function for guide displaying overview data of data for a screen with a large amount of information including a plurality of contents on a first display section;

a function for selecting an arbitrary content from within the overview data displayed on the first display section; and a function for changing, every time the content is selected, the data for the screen with the large amount of information to data for a screen with a small amount of information while arranging and displaying the selected content on a second display section.

DESCRIPTION OF REFERENCE NUMERALS

1 CELLULAR PHONE APPARATUS
2 WEB SERVER (MANAGEMENT DEVICE)
3 WIRELESS COMMUNICATION NETWORK
4 INTERNET
5, 6 DISPLAY SECTION HOUSING
11 CPU
12 ROM
13 RAM
14, 16 SCREEN CONTROLLER
15, 16 SCREEN OPERATION SECTION
18 KEY OPERATION SECTION
19 WIRELESS MODULATION AND DEMODULATION MODULE
ANT PUBLIC LINE ANTENNA
D1, D2 SCREEN

The invention claimed is:

1. A mobile terminal apparatus configured to edit, on the mobile terminal apparatus, a personal web page by changing the configuration of the personal web page from a personal-computer page configuration into a mobile-terminal-apparatus page configuration, the personal web page including a plurality of contents, and having been created in advance by a user on a personal computer and having been uploaded to a management device, each of the plurality of contents being constituted by a plurality of hypertexts, the personal-computer page configuration being configured to enable viewing, on the personal computer, the personal web page, the mobile-terminal-apparatus page configuration being configured to enable viewing, on the mobile terminal apparatus, the personal web page in an abbreviated format suitable for a screen of the mobile terminal apparatus, the apparatus comprising:

a communicating section configured to connect, via a communication network, to the management device that stores and manages the plurality of contents, the personal-computer page configuration, and the mobile-terminal-apparatus page configuration;

a first display section;

a second display section; and a central processing device configured to:
transmit a request to change the mobile-terminal-apparatus page configuration, to the management device, in response to a page configuration change operation of a user, thereby causing the management device to generate the overview page configuration of the personal-computer page configuration by replacing, with arbitrary symbols, characters included in each of the plurality of hypertexts in the personal web page, without an arrangement of the plurality of contents in the personal-computer page configuration being changed, obtain, from the management device via the communicating section, the overview page configuration of the personal-computer page configuration, in accordance with the request, display the overview page configuration on the second display section, select arbitrary content from within the overview page configuration displayed on the second display section based on a first selection operation of the user, select an arbitrary bar from among one or more indication bars displayed on the first display section that indicate candidate positions for arranging the selected arbitrary content, based on a second selection operation of the user, arrange and display, on the first display section, the selected arbitrary content at a selected candidate position indicated by the selected arbitrary bar, generate the mobile-terminal-apparatus page configuration, based on the selected arbitrary content and the selected candidate position at which the selected arbitrary content has been arranged and displayed on the first display section, and transmit, via the communication network to the management device, the generated mobile-terminal-apparatus page configuration as a page configuration change screen, and instruct the management device to register and store the generated mobile-terminal-apparatus page configuration.

2. The mobile terminal apparatus according to claim 1, further comprising:
a first web browser corresponding to the first display section and a second web browser corresponding to the second display section,
wherein the central processor device performs data transmission and reception with the management device by pressing a request from either one of the web browsers to another web browser via the communication network and the management device.

3. The mobile terminal apparatus according to claim 1, wherein, in the overview page configuration of the second display section, when another arbitrary content is selected by another section operation of the user, the other selected arbitrary content is identified and displayed, and an already-selected content also identified and displayed.

4. The mobile terminal apparatus according to claim 1, wherein the central processing device, when arranging and displaying the selected arbitrary content on the first display section, displays positions where the selected arbitrary content can be arranged as selection candidates, and, when an arbitrary candidate is selected therefrom by an arbitrary candidate user operation of the user, arranges and displays the selected arbitrary content at the position of the selected candidate.

5. A mobile communication system comprising:
a mobile terminal apparatus configured to edit, on the mobile terminal apparatus, a personal web page by changing the configuration of the personal web page from a personal-computer page configuration into a mobile-terminal-apparatus page configuration, the personal web page including a plurality of contents, and having been created in advance by a user on a personal computer and having been uploaded to a management device, each of the plurality of contents being constituted by a plurality of hypertexts, the personal-computer page configuration being configured to enable viewing, on the personal computer, the personal web page, the mobile-terminal-apparatus page configuration being configured to enable viewing, on the mobile terminal apparatus, the personal web page in an abbreviated format suitable for a screen of the mobile terminal apparatus; and
a management device to which the personal web page has been uploaded and which stores and manages the plurality of contents, the personal-computer page configuration, and the mobile-terminal-apparatus page configuration,
wherein the mobile terminal apparatus comprises:
a first display section,
a second display section,
a communicating section which connects via the communication network, to the management device, and
a central processing device configured to:
transmit a request to change the mobile-terminal-apparatus page configuration, to the management device, in response to a page configuration change operation of a user, thereby causing the management device to generate the overview page configuration of the personal-computer page configuration by replacing, with arbitrary symbols, characters included in each of the plurality of hypertexts in the personal web page, without an arrangement of the plurality of contents in the personal-computer page configuration being changed,
obtain, from the management device via the communicating section, the overview page configuration of the personal-computer page configuration, in accordance with the request,
display the overview page configuration on the second display section,
select arbitrary content from within the overview page configuration displayed on the second display section based on a first selection operation of the user,
select an arbitrary bar from among one or more indication bars displayed on the first display section that indicate candidate positions for arranging the selected arbitrary content, based on a second selection operation of the user,
arrange and display, on the first display section, the selected arbitrary content at a selected candidate position indicated by the selected arbitrary bar, generate the mobile-terminal-apparatus page configuration, based on the selected arbitrary content and the selected candidate position at which the selected arbitrary content has been arranged and displayed on the first display section, and
transmit, via the communication network to the management device, the generated mobile-terminal-apparatus page configuration for the mobile terminal apparatus as a page configuration change screen, and instruct the management device to register and store the generated mobile-terminal-apparatus page configuration, and
wherein the management device comprises a processor which is configured to:
generate the overview page configuration of the personal-computer page configuration, in accordance with the request from the mobile terminal apparatus, and
register and store the changed mobile-terminal-apparatus page configuration transmitted from the mobile terminal apparatus.

6. A mobile communication method for a mobile terminal apparatus configured to edit, on the mobile terminal apparatus, a personal web page by changing the configuration of the personal web page from a personal-computer page configuration into a mobile-terminal-apparatus page configuration, the personal web page including a plurality of contents, and having been created in advance by a user on a personal computer and having been uploaded to a management device, each of the plurality of contents being constituted by a plurality of hypertexts, the personal-computer page configuration being configured to enable viewing, on the personal computer, the personal web page, the mobile-terminal-apparatus page configuration being configured to enable viewing, on the mobile terminal apparatus, the personal web page in an abbreviated format suitable for a screen of the mobile terminal apparatus, the method comprising:
transmitting a request to change the mobile-terminal-apparatus page configuration, to the management device which stores and manages the plurality of contents, the personal-computer page configuration, and the mobile-terminal-apparatus page configuration, in response to a page configuration change operation of a user, thereby causing the management device to generate the overview page configuration of the personal-computer page configuration by replacing, with arbitrary symbols, characters included in each of the plurality of hypertexts in the personal web page, without an arrangement of the plurality of contents in the personal-computer page configuration being changed;

obtaining, from the management device, the overview page configuration of the personal-computer page configuration, in accordance with the request;

displaying the overview page configuration on a second display section of the mobile terminal apparatus;

selecting arbitrary content from within the overview page configuration displayed on the second display section based on a first selection operation of the user;

selecting an arbitrary bar from among one or more indication bars displayed on a first display section that indicate candidate positions for arranging the selected arbitrary content, based on a second selection operation of the user;

arranging and displaying, on the first display section, the selected arbitrary content at a selected candidate position indicated by the selected arbitrary bar;

generating the mobile-terminal-apparatus page configuration, based on the selected arbitrary content and the selected candidate position at which the selected arbitrary content has been arranged and displayed on the first display section; and transmitting, to the management device, the generated mobile-terminal-apparatus page configuration as a page configuration change screen, and instructing the management device to register and store the generated mobile-terminal-apparatus page configuration.

7. A non-transitory computer-readable storage medium having a program stored thereon that is executable by a computer, of a mobile terminal apparatus configured to edit, on the mobile terminal apparatus, a personal web page by changing the configuration of the personal web page from a personal-computer page configuration into a mobile-terminal-apparatus page configuration, the personal web page including a plurality of contents, and having been created in advance by a user on a personal computer and having been uploaded to a management device, each of the plurality of contents being constituted by a plurality of hypertexts, the personal-computer page configuration being configured to enable viewing, on the personal computer, the personal web page, the mobile-terminal-apparatus page configuration being configured to enable viewing, on the mobile terminal apparatus, the personal web page in an abbreviated format suitable for a screen of the mobile terminal apparatus, to perform functions comprising:

transmitting a request to change the mobile-terminal-apparatus page configuration, to the management device which stores and manages the plurality of contents, the personal-computer page configuration, and the mobile-terminal-apparatus page configuration, in response to a page configuration change operation of a user, thereby causing the management device to generate the overview page configuration of the personal-computer page configuration by replacing, with arbitrary symbols, characters included in each of the plurality of hypertexts in the personal web page, without an arrangement of the plurality of contents in the personal-computer page configuration being changed;

obtaining, from the management device, the overview page configuration of the personal-computer page configuration, in accordance with the request;

displaying the overview page configuration on a second display section of the mobile terminal apparatus;

selecting arbitrary content from within the overview page configuration displayed on the second display section based on a first selection operation of the user;

selecting an arbitrary bar from among one or more indication bars displayed on a first display section that indicate candidate positions for arranging the selected arbitrary content, based on a second selection operation of the user;

arranging and displaying, on the first display section, the selected arbitrary content at a selected candidate position indicated by the selected arbitrary bar generating the mobile-terminal-apparatus page configuration, based on the selected arbitrary content and the selected candidate position at which the selected arbitrary content has been arranged and displayed on the first display section; and transmitting, to the management device, the generated mobile-terminal-apparatus page configuration as a page configuration change screen, and instructing the management device to register and store the generated mobile-terminal-apparatus page configuration.

* * * * *